US010810089B1

United States Patent
Gu et al.

(10) Patent No.: US 10,810,089 B1
(45) Date of Patent: Oct. 20, 2020

(54) AUTOMATICALLY ADJUSTING BACKUP SET RULES BASED ON ANOMALOUS BACKUP ACTIVITY

(71) Applicant: Symantec Corporation, Mountain View, CA (US)

(72) Inventors: Lei Gu, Bedford, MA (US); Ilya Sokolov, Boston, MA (US)

(73) Assignee: NORTONLIFELOCK INC., Mountain View, CA (US)

( * ) Notice: Subject to any disclaimer, the term of this patent is extended or adjusted under 35 U.S.C. 154(b) by 241 days.

(21) Appl. No.: 15/665,257

(22) Filed: Jul. 31, 2017

(51) Int. Cl.
*G06F 11/14* (2006.01)
*G06F 16/11* (2019.01)

(52) U.S. Cl.
CPC ...... *G06F 11/1461* (2013.01); *G06F 11/1448* (2013.01); *G06F 16/113* (2019.01); *G06F 16/122* (2019.01)

(58) Field of Classification Search
CPC ............. G06F 11/1461; G06F 16/113; G06F 11/1448; G06F 16/122; G06F 21/56; H04L 63/1425
See application file for complete search history.

(56) References Cited

U.S. PATENT DOCUMENTS

| | | | |
|---|---|---|---|
| 8,533,818 B1 * | 9/2013 | Ketterhagen | G06F 21/567 726/22 |
| 9,424,074 B1 * | 8/2016 | Pjesivac-Grbovic | G06F 9/48 |
| 9,798,629 B1 * | 10/2017 | Shilane | G06F 16/2365 |
| 9,804,909 B1 * | 10/2017 | Fang | G06F 11/0751 |
| 10,216,432 B1 * | 2/2019 | Kulkarni | G06F 3/067 |
| 2010/0070475 A1 * | 3/2010 | Chen | G06F 11/1451 707/640 |
| 2017/0104776 A1 * | 4/2017 | Halfon | H04L 63/1425 |
| 2017/0180394 A1 * | 6/2017 | Crofton | H04L 63/145 |
| 2017/0199671 A1 * | 7/2017 | Tormasov | G06F 11/1451 |
| 2018/0024893 A1 * | 1/2018 | Sella | G06F 11/1458 |

* cited by examiner

*Primary Examiner* — Robert W Beausoliel, Jr.
*Assistant Examiner* — Mohammad Solaiman Bhuyan
(74) *Attorney, Agent, or Firm* — Patent Law Works LLP

(57) ABSTRACT

Backup metrics are received from multiple endpoints. Backup baselines are established, based on backup metrics received over a period of time. Each established backup baseline specifies an empirically determined baseline level of backup activity according to specific criteria. Changes in backup behavior are detected, as measured against established backup baselines, based on analyzing received backup metrics. Such changes can be detected by applying a non-supervised machine learning technique to backup metrics. Detected backup behavior changes that meet a corresponding threshold are further analyzed to determine whether to alter corresponding backup activity in response. Backup activity on endpoints can be modified, in response to the analysis. This can take the form of omitting specific files or folders from corresponding backups, or changing default backup configuration(s). For example, a new or modified default backup configuration can be transmitted to one or more endpoints.

20 Claims, 5 Drawing Sheets

AUTOMATICALLY ADJUSTING BACKUP SET RULES BASED ON ANOMALOUS BACKUP ACTIVITY

TECHNICAL FIELD

This disclosure pertains generally to computer backup, and more specifically to automatically adjusting backups and default backup configurations based on anomalous backup activity.

BACKGROUND

Backup solutions automatically backup files from the computers of users and organizations to the cloud, according to a backup configuration. An endpoint component of a backup system runs on a user's computer, and performs the client side backup functionality. The backed-up files are maintained in the cloud by a backend component of the backup system, and are available to be restored in case of data loss. For each covered endpoint, a backup configuration specifies the specific folders/directories, files, file types, etc. to backup, as well as other criteria such as backup time and frequency. Contemporary backup systems typically provide a default backup configuration, which the majority of users do not change. Although the default configuration identifies folders and files present on a typically configured endpoint that many users wish to have backed-up, system, application and user level changes occur over time that can result in the default configuration becoming less than ideal for many users.

To give a specific example, under previous versions of Microsoft Windows® it was typical for the default configuration to specify to backup all documents, images, videos and html files in the "My Document" folder and its sub-folders. This was desirable by default, because typical users kept their personally created content therein. However, subsequent versions of Windows remove the "My Document" folder, and instead link the label "My Document" to the user's home directory, which happens to include the hidden folder "AppData." This led to the backup, by default, of all images and html files under "AppData," which the typical user is unaware of, and does not want backed-up. The backup of "AppData" often accounts for more than 50% of all files being backed up for a typical user, thereby reducing the available storage for backup of files that the user truly cares about, as well as raising costs for the provider of the backup system.

This is only a single example. In general, changes to the operating system, application level updates, user made changes and other factors on the endpoint level can result in the default backup configuration automatically backing-up files outside of the desired defaults.

It would be desirable to address these issues.

SUMMARY

Anomalous backup activity is managed in conjunction with a backup system. The backup system and the anomalous backup activity manager have centralized backend components and multiple endpoint components on corresponding endpoint computers. The endpoints gather backup metrics over time, and transmit them to the backend. Thus, backup metrics are received on the backend from multiple endpoints. Updated backup metrics can be received periodically from endpoints, enabling the maintenance of current information concerning backup activity on multiple ones of the endpoint computers. Backup metrics can include information concerning backup activity and/or backup settings on endpoints, as well as identifiers of originating endpoints and identifiers of corresponding backup configurations. Backup metrics can also further include information concerning hardware configurations and/or software configurations of endpoint computers, where the given configuration information is relevant to establishing backup baselines and detecting deviations therefrom.

One or more backup baselines are established, based on backup metrics received from one or more endpoint computers over a given period of time. Each established backup baseline specifies an empirically determined baseline level of backup activity according to specific criteria. Backup baselines can be established at any desired level of granularity, such as per specific endpoint computer, specific user, specific default backup configuration, specific organization, specific operating system, etc. Existing backup baselines can be updated, and new ones can be created, based on newly received backup metrics.

Changes in backup behavior are detected, as measured against one or more established backup baselines, based on analyzing received backup metrics. Such changes can be detected by, for example, applying one or more non-supervised machine learning techniques to received backup metrics, such as clustering algorithms, anomaly detection algorithms, etc. Changes in backup behavior can be detected at any desired level of granularity, such as specific endpoint computer, user, default backup configuration, organization, operating system, etc. Detected backup behavior changes that meet at least one corresponding specific threshold are further analyzed, e.g., to determine whether to alter corresponding backup activity in response. For example, changes in backup activity that deviate from one or more corresponding backup baselines by at least one specific threshold level can be flagged. The flagged changes can then be analyzed further, to determine whether to modify at least one corresponding backup in response.

Backup activity on one or more endpoints can be modified, in response to the analysis of at least one detected behavior change. This can take the form of omitting one or more specific files, folders and/or directories from one or more corresponding backups. Another option is to change at least one default backup configuration in use by the backup system. For example, a new or modified default backup configuration can be transmitted to one or more endpoints.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
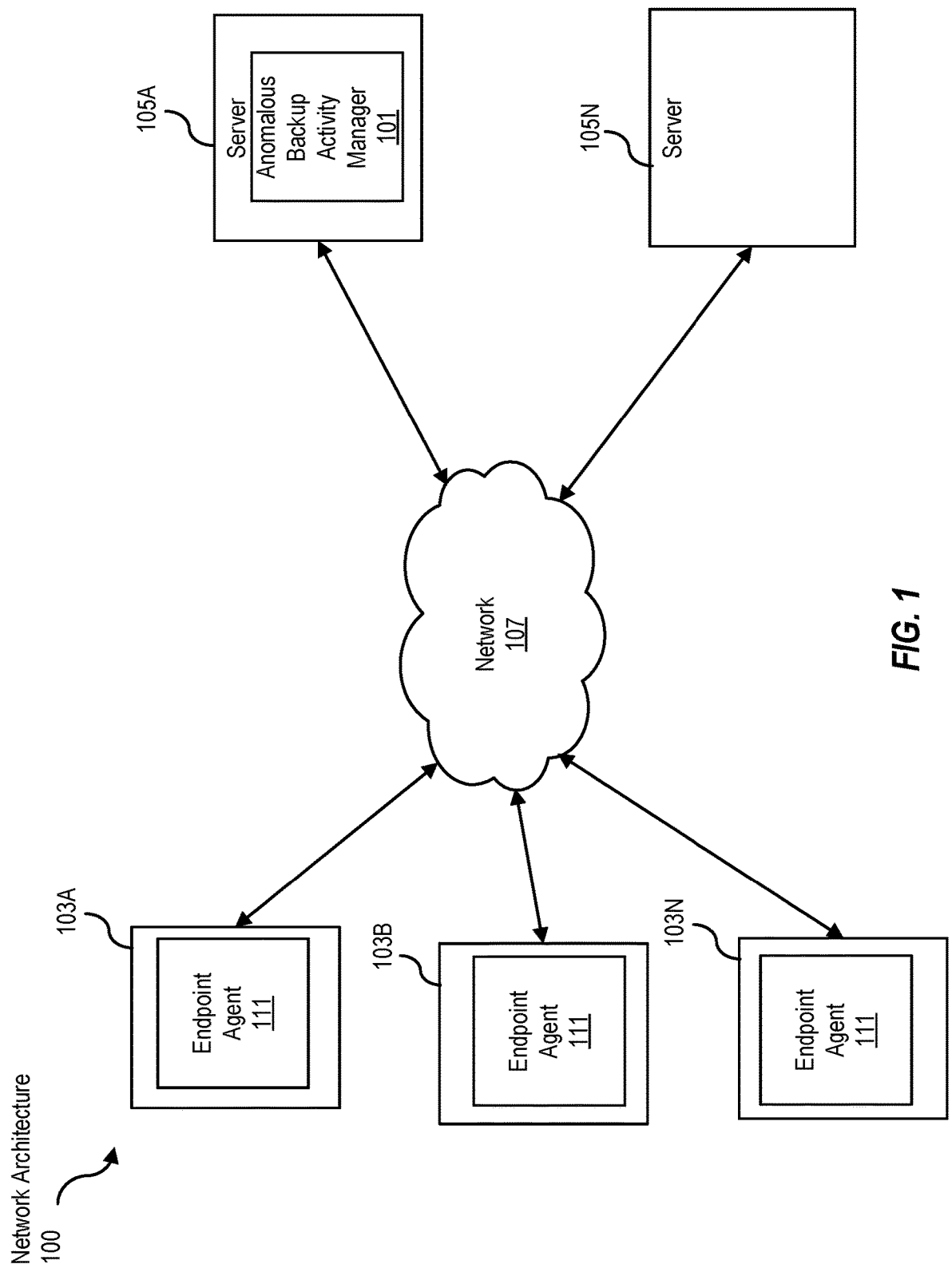
FIG. 1 is a block diagram of an exemplary network architecture in which an anomalous backup activity manager can be implemented, according to some embodiments.

FIG. 1 is a block diagram illustrating an exemplary network architecture 100 in which an anomalous backup activity manager 101 can be implemented. The illustrated network architecture 100 comprises multiple clients 103A, 103B and 103N, as well as multiple servers 105A and 105N. In FIG. 1, an anomalous backup activity manager 101 is illustrated as residing on server 105A, with an endpoint agent 111 residing on each client 103A-C. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of desktop/laptop computers, or mobile computing devices, comprising portable computer systems capable of connecting to a network 107 and running applications (e.g., smartphones, tablet computers, wearable computing devices, etc.).

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
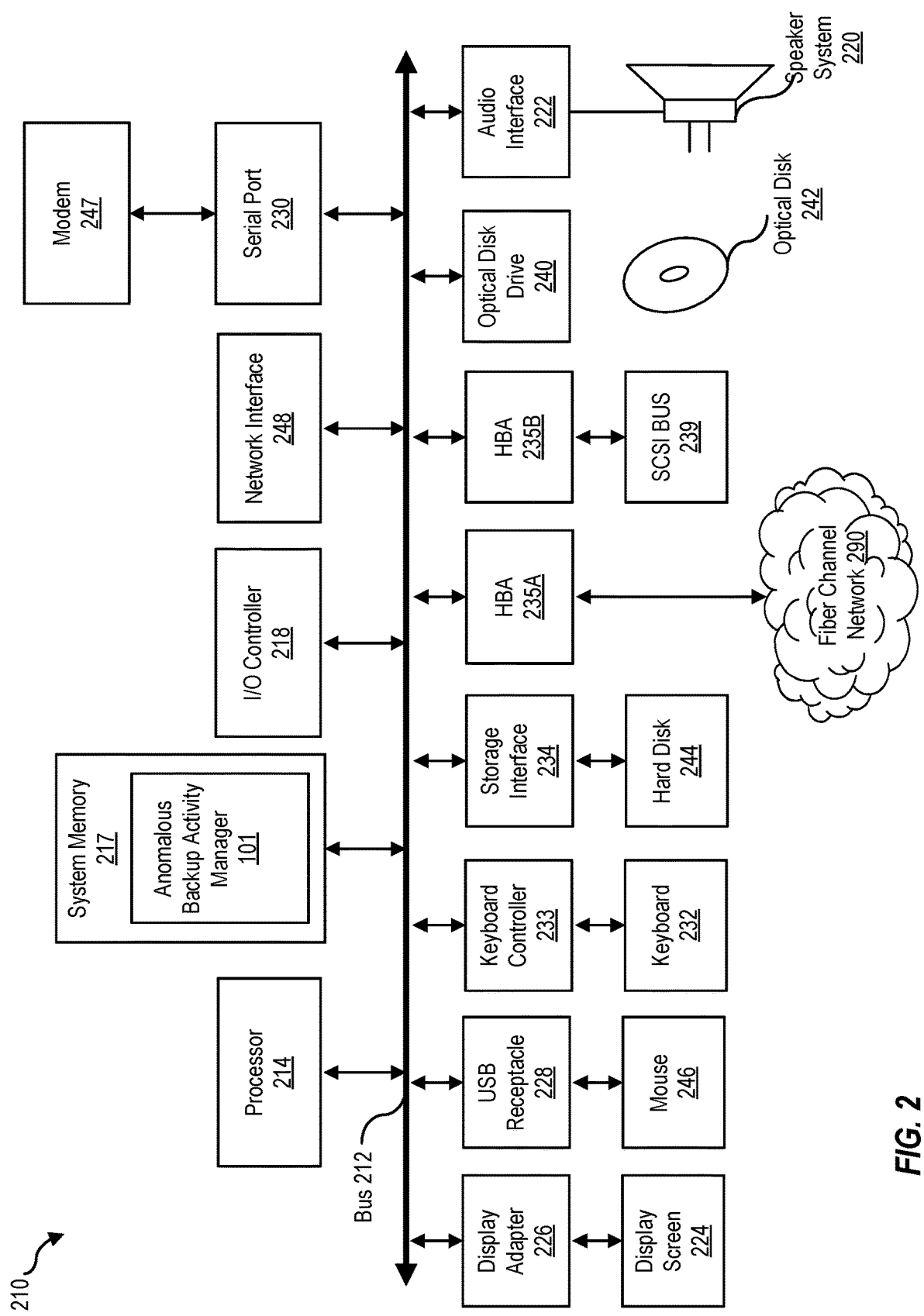
FIG. 2 is a block diagram of a computer system suitable for implementing an anomalous backup activity manager, according to some embodiments.

FIG. 2 is a block diagram of a computer system 210 suitable for implementing an anomalous backup activity manager 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) ports 228, serial ports 230, etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the anomalous backup activity manager 101 is illustrated as residing in system memory 217. The workings of the anomalous backup activity manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
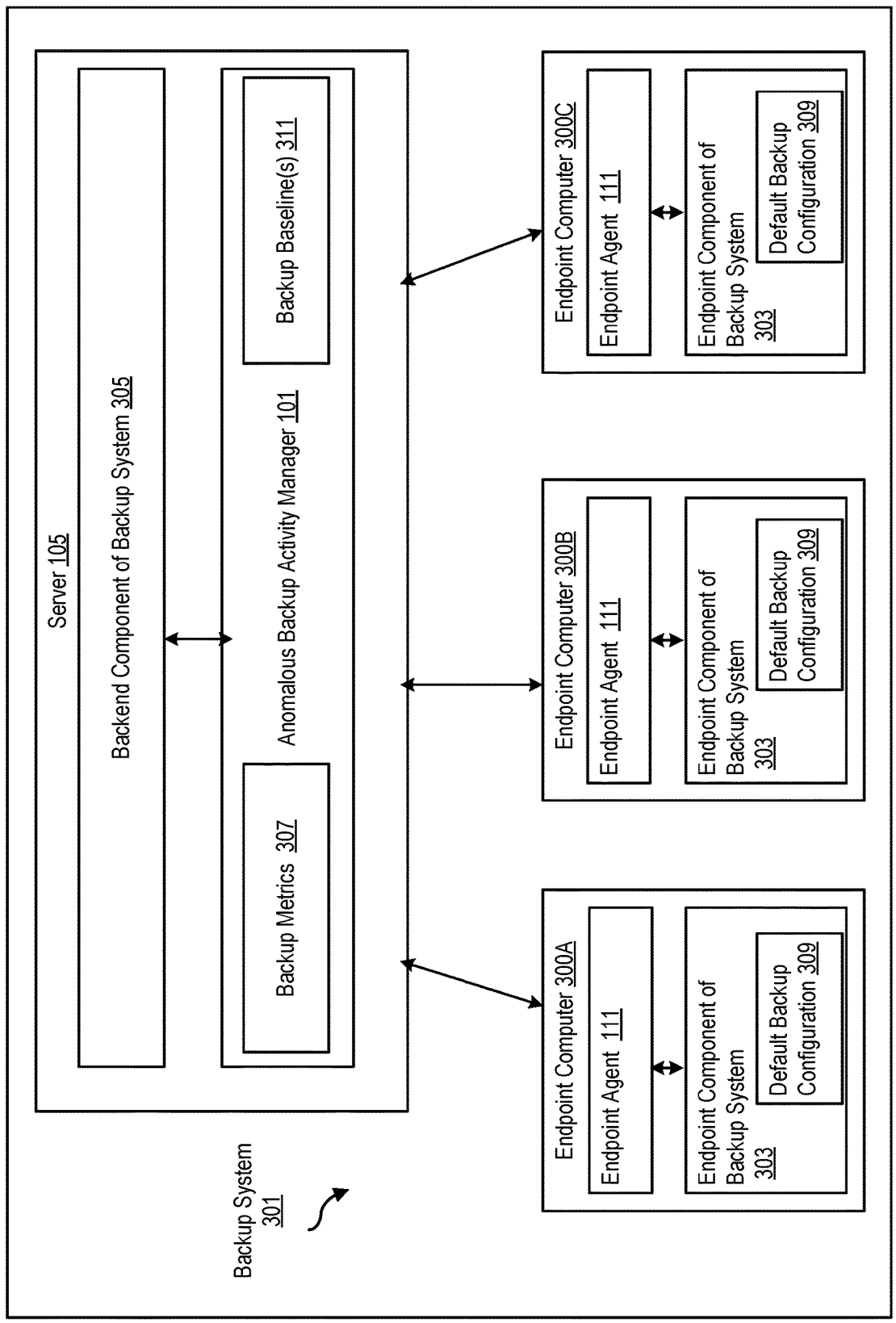
FIG. 3 is a block diagram of the operation of an anomalous backup activity manager, according to some embodiments.

FIG. 3 illustrates the operation of an anomalous backup activity manager 101 running on a server 105 and communicating through a network 107 (e.g., the Internet) with multiple endpoint agents 111. As described above, the functionalities of the anomalous backup activity manager 101 can reside on specific computers 210 or be otherwise distributed between multiple computer systems 210, including within a fabric/cloud-based computing environment in which the functionality of the anomalous backup activity manager 101 is provided as a service over a network 107.

As illustrated in FIG. 3, the anomalous backup activity manager 101 runs in conjunction with a backend (e.g., server side, cloud based) component 305 of a backup system 301, whereas the endpoint agents 111 run in conjunction with endpoint (e.g., client side) components 303 of a backup system 301. In FIG. 3, the anomalous backup activity manager 101 and endpoint agents 111 are depicted as separate entities that are communicatively coupled with the backend component 305 and endpoint component 303 of the backup system 301. It is to be understood that in some embodiments, the anomalous backup activity manager 101 and/or endpoint agents 111 can be instantiated as components of the backup system 301. The backend component 305 of the backup system 301 and the anomalous backup activity manager 101 are illustrated as residing on the same server 105, although the functionalities associated with one or both of these components can be distributed across multiple computers 210 at a single or multiple locations as desired.

The centralized backend component 305 of the backup system 301 communicates with a large number of endpoint computers 300 on which the endpoint level components 303 of the backup system 301 are installed. These endpoints 300 are the computer systems 210 of the customers of the backup system 301 vendor. Although FIG. 3 only depicts three endpoint computers 300 for clarity of illustration, it is to be understood that in practice the centralized backend component 305 of the backup system 301 can communicate with orders of magnitude more endpoints 300 (e.g., dozens, hundreds, thousands, tens of thousands, etc.), depending on the size of the installed customer base.

As illustrated in FIG. 3, the anomalous backup activity manager 101 automatically detects and manages anomalous backup activity. The endpoint agents 111 on the multiple endpoint computers 300 gather backup metrics 307, and provide them to the centralized anomalous backup activity manager 101. The backup metrics 307 received over time are used to establish baselines 311 for backup activity. Changes in backup activity from these baselines 311 are detected, and behavior changes that are sufficiently anomalous as measured against a given threshold are further analyzed. In response to the analysis, the anomalous backup activity manager 101 omits specific files from corresponding backups and/or adjusts default backup configuration(s) 309. This enables the backup system 301 to be more efficient by reducing the number of unnecessary files to backup, thereby freeing up user storage allocations for important files, and saving computing and storage resources at a backup system 301 level.

Figure 4:
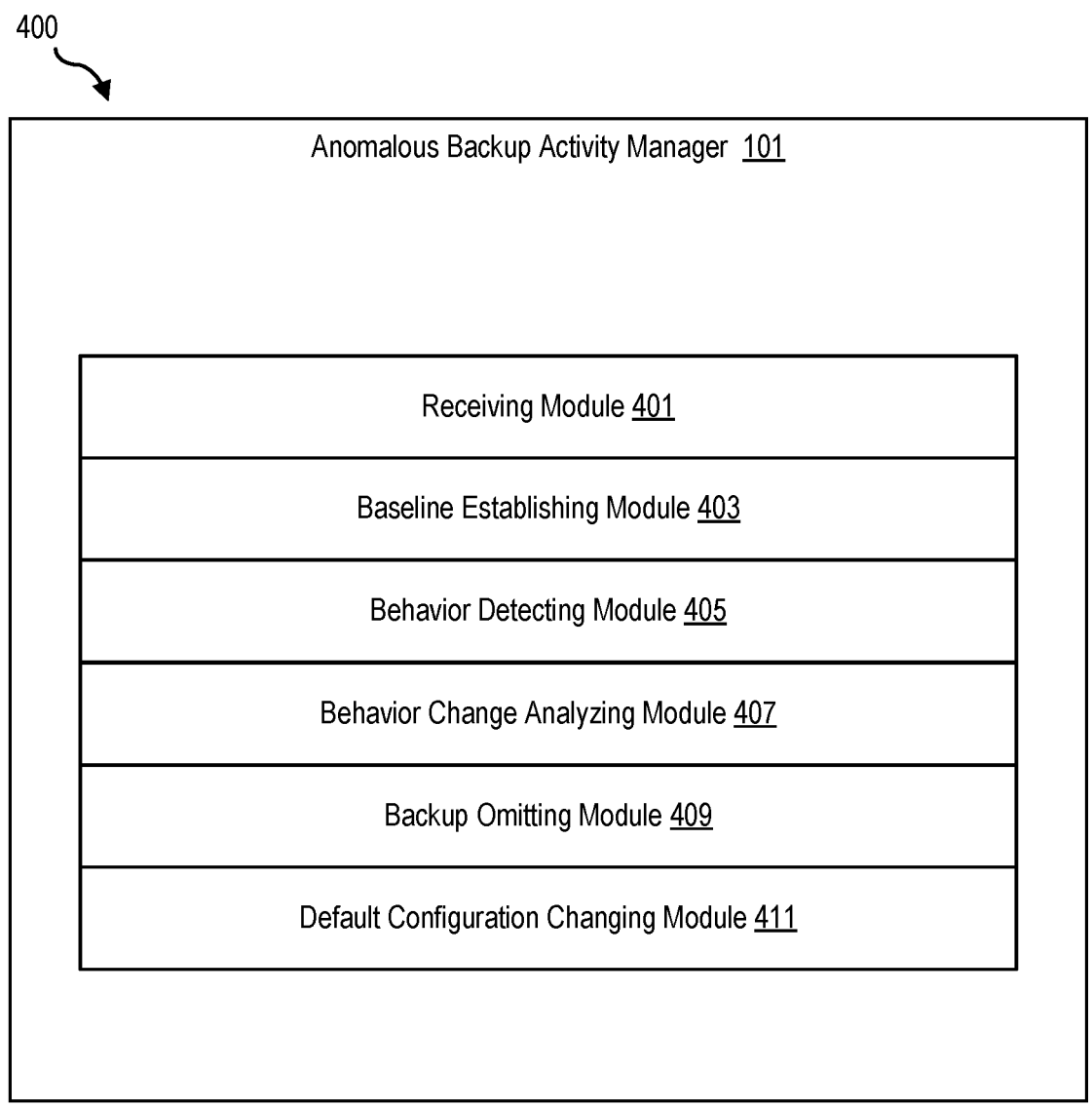
FIG. 4 is a block diagram of an anomalous backup activity manager, according to some embodiments.

FIG. 4 illustrates a specific multiple module instantiation of an anomalous backup activity manager 101, according to one embodiment. It is to be understood that although the anomalous backup activity manager 101 is illustrated as a single entity, the illustrated anomalous backup activity manager 101 represents a collection of functionalities, which can be instantiated as a single or multiple modules as desired. It is to be understood that the modules of the anomalous backup activity manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the anomalous backup activity manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Figure 5:
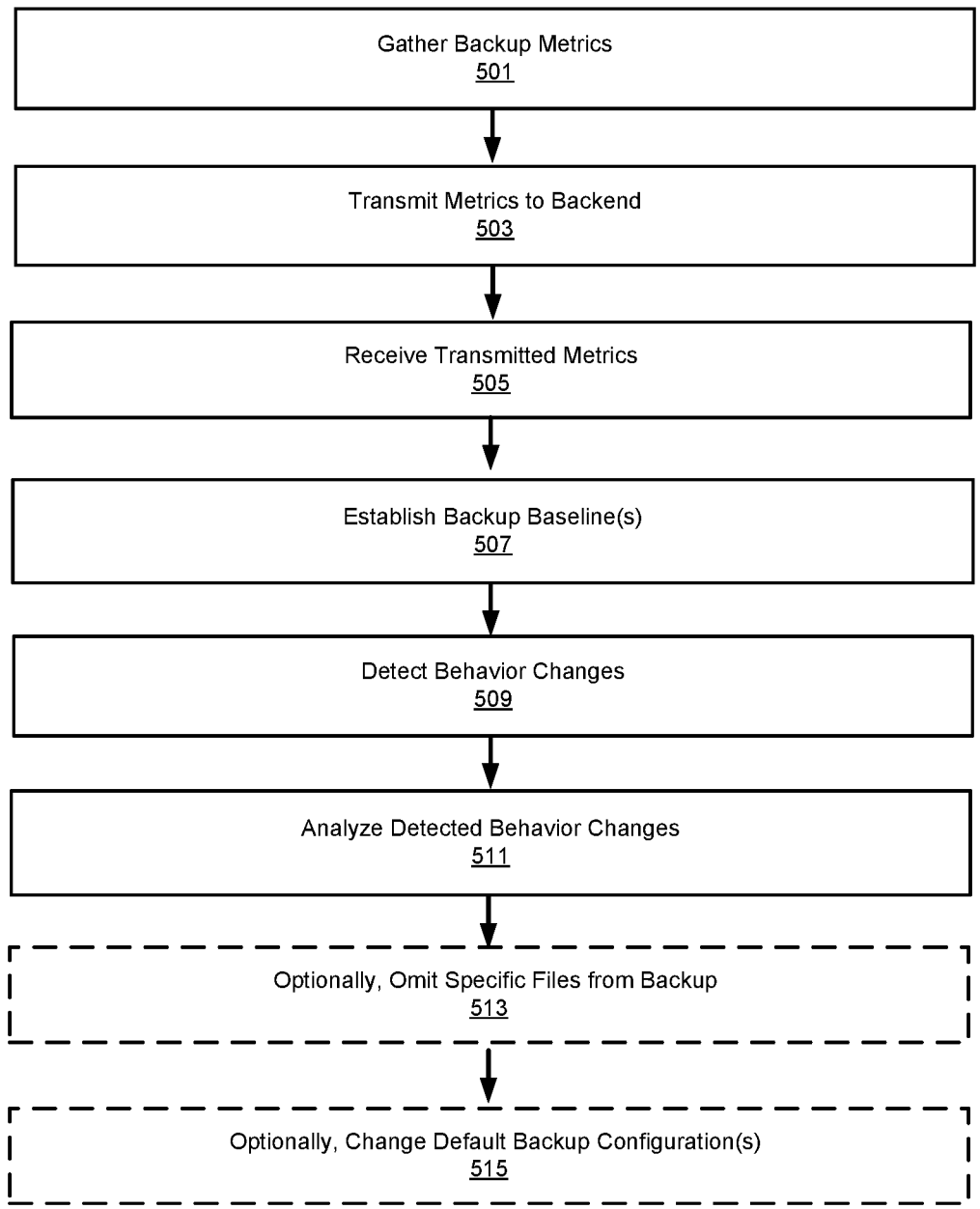
FIG. 5 is a flowchart illustrating steps performed by an anomalous backup activity manager, according to some embodiments.

FIG. 5 illustrates steps executed by the anomalous backup activity manager 101, according to some embodiments. For clarity of description, the subject matter illustrated in FIGS. 4 and 5 is described together below.

On each given endpoint computer 300 on which an endpoint agent 111 is installed, the endpoint agent 111 gathers 501 metrics 307 concerning the user's backup activity over time, and transmits 503 those backup metrics 307 to the centralized anomalous backup activity manager 101 in the cloud. A receiving module 401 of the anomalous backup activity manager 101 receives 505 backup metrics 307 from multiple endpoint agents 111 running on multiple endpoint computers 300. The endpoint agents 111 can provide the receiving module 401 with updated backup metrics 307 periodically, thereby maintaining current information concerning backup activity from the various endpoints 300. The frequency at which endpoint agents 111 transmit updated backup metrics 307 is a variable design parameter, which can be set as desired according to different scenarios.

The type, content and format of the backup metrics 307 is also a variable design parameter. Examples of backup metrics 307 include but are not limited to the number of backup files within a given user's various backup folders/directories, the number of files per folder/directory, the size distribution of a given user's backup files across default backup folders/directories and across all backup folders/directories, size distribution based on file types with a given user's default backup folders/directories and all backup folders/directories, number and size of daily backup files, storage usage grouped by file sizes, file types and/or folders/directories, etc. Backup metrics 307 can also include recent endpoint events such as operating system update/upgrade, new software installation/upgrade, downloading of new configuration or other files associated with an application program, etc. The endpoint agent 111 installed on a given endpoint computer 300 gathers these backup metrics 307, and transmits them to the anomalous backup activity manager 101. Basically, any information concerning the user's backup activity and/or settings, as well as information concerning the hardware and/or software configuration of the endpoint computer 300 itself that is considered relevant to establishing backup baselines 311 and detecting deviations therefrom can be included in the backup metrics 307 as desired. Each transmission of backup metrics 307 also typically includes an identifier of the specific endpoint 300 from which the backup metrics 307 originate, as well as an identifier of the backup configuration 309 in use on that endpoint 300.

A baseline establishing module 403 of the anomalous backup activity manager 101 establishes 507 backup baselines 311, based on backup metrics 307 received over a given period of time. A backup baseline 311 specifies an empirically determined expected baseline level of backup activity according to any one or more of the criteria included in the backup metrics 307 in the given embodiment. For example, backup baselines 311 can specify numbers of files, sizes of files, types of files, distributions across folders/directories, groupings, and other similar criteria expected in future backups, at any level of granularity. By analyzing backup metrics 307 received over time, the baseline establishing module 403 can determine what the level of backup activity has been historically, and thus what can be expected going forward. Backup baselines 311 can be set per user/endpoint computer 300, per default backup configuration 309, per organization (e.g., all endpoints 300 within a given company), per operating system, or at any desired level of granularity. The length of the period of time for which gathered backup metrics 307 are analyzed in order to establish backup baselines 311 is a variable design parameter, that can be adjusted between embodiments, baseline 311 level or other factors as desired. In some embodiments, the baseline establishing module 403 updates baselines 311 or creates new ones based on newly received backup metrics 307. How often and when to do so is a variable design parameter.

A behavior change detecting module 405 of the anomalous backup activity manager 101 analyzes received backup metrics 307 and detects 509 changes in backup behavior against the established baseline(s) 311. In some embodiments, the behavior change detecting module 405 applies one or more non-supervised machine learning techniques to received backup metrics 307 to detect behavior changes. Different non-supervised machine learning techniques can be utilized in different embodiments, such as clustering algorithms (e.g., k-means, mixture models, hierarchical clustering) and/or anomaly detection algorithms (e.g., density-based techniques, subspace-based and correlation-based outlier detection, one class support vector machines, replicator neural networks, cluster analysis-based outlier detection, deviations from association rules and frequent item sets, etc.). Such techniques are known to those of ordinary skill in the relevant art, and the implementation details of their use within the context of detecting changes in backup behaviors will be apparent to those of such a skill level in light of the present disclosure. For example, in the case of a clustering algorithm, a behavior change or anomaly would be indicated when a threshold number of endpoints 300 originally belonging to one cluster start joining another cluster and/or start forming a new one.

In different embodiments, the behavior change detecting module 405 can detect changes in backup behaviors at the level of individual endpoints 300, organizations, default backup configurations 309, operating systems and/or other levels of granularity as desired. The specific criteria for which changes are detected varies between embodiments, and can be at any desired level of granularity. Examples include but are not limited to changes in file size, number of files and/or file type overall or per specific directories/folders, changes in file distribution (size, number and/or type) overall or per folder/directory, new folders/directories containing threshold numbers/sizes of files, changes in overall storage usage grouped by file size or file types, etc.

The behavior change detecting module 405 flags changes in backup activity that deviate from the corresponding baseline(s) 311 by at least a threshold level. Changes that meet a given threshold are subject to further analysis and possible action to modify the backup, as described in detail below. What thresholds to use for given changes and baselines 311 is a variable design parameter.

A behavior change analyzing module 407 of the anomalous backup activity manager 101 analyzes 511 detected behavior changes that meet corresponding thresholds. A detected behavior changes that meets the given threshold is considered sufficiently anomalous to analyze further, in order to determine whether to alter the corresponding backup activity and/or change the corresponding default backup configuration 309. To do so, factors are examined that are indicative of the nature of the new files and/or folders/directories targeted for backed-up, beyond what would be expected per the corresponding baseline(s) 311. One example of such a factor is the source of the additional new files and/or folders/directories (e.g., did they originate from new folders/directories or existing ones?; were they downloaded from the Internet; are they part of the OS?). Some sources may be considered indicative of the user actually wanting the files to be backed-up, whereas others may be indicative of the opposite. Another example factor is a comparison of the distribution of the new files based on file type against the existing baseline 311 to predict the legitimacy of these new files. For example, a lot of new smaller png or html files are likely not something that users want to backup, as opposed to larger files of types indicative of user created content. Which specific factors to analyze is a variable design parameter, and can be adjusted between embodiments at any level of granularity.

In response to the analysis of one or more detected behavior changes, corresponding backup activity can be modified. For example, a backup omitting module 409 of the anomalous backup activity manager 101 can omit 513 specific files and/or folders/directories from corresponding backups. For example, where the analysis reveals that given files are a result of an operating system upgrade or developer error, the backup omitting module 409 can direct corresponding endpoints 300 to skip over those files in a current or future backup. Which specific factors are used to determine to omit files and/or folders/directories from a backup are a variable design parameter. Examples include but are not limited to files being part of the operating system, files having been downloaded from the Internet, files being small image and/or html files, a large number of new files of different types, etc.

Instead of or in addition to omitting files, in response to the analysis of detected behavior changes, a default configuration changing module 411 of the anomalous backup activity manager 101 can change 515 one or more default backup configurations 309 in use by the backup system 301. For example, a default backup configuration 309 can be modified to exclude from future backups those files and/or folders/directories designated for omission from a given backup, as described above. The default configuration changing module 411 can, for example, provide new or modified default backup configurations 309 to corresponding endpoints 300.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for managing anomalous backup activity in a backup system comprising a centralized computer and a plurality of endpoint computers, the method comprising:
receiving backup metrics, by the centralized computer from multiple endpoint computers;
establishing, by the centralized computer, at least one backup baseline based on the backup metrics received from at least one endpoint computer over a given period of time, an established backup baseline specifying an empirically determined baseline level of backup activity according to specific criteria included in the backup metrics, the established backup baseline specifying at least one parameter from a group of parameters consisting of numbers of files, sizes of files, types of files, distributions across directories or across folders, and file groupings expected in a future backup;

detecting, by the centralized computer, changes in backup behavior against the at least one established baseline, based on analyzing received backup metrics;

analyzing, by the centralized computer, detected backup behavior changes that meet at least one corresponding specific threshold;

determining whether to modify backup activity based on a source from which new files included in at least one detected backup behavior change originated; and responsive to determining to modify the backup activity, modifying, by the centralized computer, the backup activity on at least one endpoint computer by omitting files from at least one specific folder or directory from a current or future backup.

2. The method of claim 1 wherein receiving the backup metrics from a specific one of the endpoint computers of the plurality further comprises:

receiving metrics concerning a corresponding user's backup activity gathered over time by the specific one of the endpoint computers.

3. The method of claim 1 wherein receiving the backup metrics further comprises:

periodically receiving updated backup metrics, by the centralized computer from multiple endpoint computers; and maintaining, by the centralized computer, current information concerning backup activity on the multiple endpoint computers.

4. The method of claim 1 wherein the backup metrics further comprise:

information concerning the backup activity and/or backup settings on the at least one endpoint computer.

5. The method of claim 1 wherein the backup metrics further comprise:

information concerning hardware configuration and/or software configuration of the at least one endpoint computer that is relevant to establishing backup baselines and detecting deviations from established backup baselines.

6. The method of claim 1 wherein the backup metrics further comprise:

identifiers of originating endpoints.

7. The method of claim 1 wherein the backup metrics further comprise:

identifiers of corresponding backup configurations.

8. The method of claim 1 wherein establishing the at least one backup baseline further comprises:

establishing the at least one backup baseline at a level from a group consisting of:
specific endpoint computer, specific user, specific default backup configuration,
specific organization and specific operating system.

9. The method of claim 1 wherein establishing the at least one backup baseline further comprises:

updating at least one existing backup baseline, or creating at least one new backup baseline, based on newly received backup metrics.

10. The method of claim 1 wherein detecting the changes in backup behavior further comprises:

applying at least one non-supervised machine learning techniques to received backup metrics.

11. The method of claim 10 further comprising:

applying a clustering algorithm to received backup metrics.

12. The method of claim 10 further comprising:

applying an anomaly detection algorithm to received backup metrics.

13. The method of claim 1 wherein detecting the changes in backup behavior further comprises:

detecting the changes in backup behavior at a level from a group consisting of: specific endpoint computer, specific user, specific default backup configuration, specific organization and specific operating system.

14. The method of claim 1 wherein analyzing the detected backup behavior changes that meet the at least one corresponding specific threshold further comprises:

analyzing the detected backup behavior changes that meet the at least one corresponding specific threshold to determine whether to alter corresponding backup activity in response.

15. The method of claim 1 wherein analyzing the detected backup behavior changes that meet the at least one corresponding specific threshold further comprises:

flagging changes in backup activity that deviate from at least one corresponding baseline by at least one specific threshold level; and analyzing the flagged changes further, to determine whether to modify the at least one corresponding backup in response.

16. The method of claim 1 wherein at least one file omitted from the current or future backup comprises a file that is a result of an operating system upgrade or developer error.

17. The method of claim 1 wherein modifying the backup activity further comprises:

changing at least one default backup configuration in use by the backup system.

18. The method of claim 17 wherein changing the at least one default backup configuration in use by the backup system further comprises:

transmitting, by the centralized computer to the at least one endpoint computer, a new or modified default backup configuration.

19. At least one non-transitory computer readable-storage medium for managing anomalous backup activity in a backup system comprising a centralized computer and a plurality of endpoint computers, the at least one non-transitory computer readable-storage medium storing computer executable instructions that, when loaded into computer memory and executed by at least one processor of a computing device, cause the computing device to perform the following steps:

receiving backup metrics, by the centralized computer from multiple endpoint computers;

establishing, by the centralized computer, at least one backup baseline based on the backup metrics received from at least one endpoint computer over a given period of time, an established backup baseline specifying an empirically determined baseline level of backup activity according to specific criteria included in the backup metrics, the established backup baseline specifying at least one parameter from a group of parameters consisting of numbers of files, sizes of files, types of files, distributions across directories or across folders, and file groupings expected in a future backup;

detecting, by the centralized computer, changes in backup behavior against the at least one established baseline, based on analyzing received backup metrics;

analyzing, by the centralized computer, detected backup behavior changes that meet at least one corresponding specific threshold;

determining whether to modify backup activity based on a source from which new files included in at least one detected backup behavior change originated; and responsive to determining to modify the backup activity, modifying, by the centralized computer, the backup activity on at least one endpoint computer by omitting files from at least one specific folder or directory from a current or future backup.

20. A computer system for managing anomalous backup activity in a backup system, the computer system comprising:

at least one processor;

system memory;

a receiving module residing in the system memory, the receiving module being programmed to receive backup metrics from multiple endpoint computers;

a baseline establishing module residing in the system memory, the baseline establishing module being programmed to establish at least one backup baseline based on the backup metrics received from at least one endpoint computer over a given period of time, an established backup baseline specifying an empirically determined baseline level of backup activity according to specific criteria included in the backup metrics, the established backup baseline specifying at least one parameter from a group of parameters consisting of numbers of files, sizes of files, types of files, distributions across directories or across folders, and file groupings expected in a future backup;

a behavior change detecting module residing in the system memory, the behavior change detecting module being programmed to detect changes in backup behavior against the at least one established baseline, based on analyzing received backup metrics; and a behavior change analyzing module residing in the system memory, the behavior change analyzing module being programmed to analyze detected backup behavior changes that meet at least one corresponding specific threshold, to determine whether to modify backup activity based on a source from which new files included in at least one detected backup behavior change originated, and, responsive to determining to modify the backup activity, to modify backup activity on at least one endpoint computer by omitting files from at least one specific folder or directory from a current or future backup.

* * * * *